United States Patent [19]

Nakamura

[11] Patent Number: 4,761,431
[45] Date of Patent: Aug. 2, 1988

[54] PRE-EXPANDED PARTICLES OF PROPYLENE RESIN

[75] Inventor: Kyoichi Nakamura, Ibaraki, Japan

[73] Assignee: Kanegafuchi Kagaku Kogyo Kabushiki Kaisha, Osaka, Japan

[21] Appl. No.: 110,258

[22] Filed: Oct. 20, 1987

Related U.S. Application Data

[62] Division of Ser. No. 53,662, May 26, 1987, Pat. No. 4,720,509.

[30] Foreign Application Priority Data

May 27, 1986 [JP] Japan .................. 61-121486

[51] Int. Cl.$^4$ .............................................. C08V 9/02
[52] U.S. Cl. ........................ 521/60; 521/56; 521/58; 521/59
[58] Field of Search ........................... 521/56, 58, 60

[56] References Cited

U.S. PATENT DOCUMENTS

| | | | |
|---|---|---|---|
| 4,399,087 | 8/1983 | Akiyama et al. | 521/60 |
| 4,436,840 | 3/1984 | Akiyama et al. | 521/58 |
| 4,448,901 | 5/1984 | Senda et al. | 521/58 |
| 4,464,484 | 8/1984 | Yoshimura et al. | 521/58 |
| 4,602,047 | 7/1986 | Endo et al. | 521/56 |
| 4,695,593 | 9/1987 | Kuwabara et al. | 521/60 |
| 4,720,509 | 1/1988 | Nakamura | 521/58 |

Primary Examiner—Morton Foelak
Attorney, Agent, or Firm—Armstrong, Nikaido, Marmelstein & Kubovcik

[57] ABSTRACT

A pre-expanded particle of a propylene resin having two melting temperatures as determined by DSC, the heat of fusion for the peak based on the higher melting temperature being 0.5 to 2.3 cal/g. By using the pre-expanded particles of the propylene resin of the invention, foamed articles having excellent surface appearance, small dimentional shrinkage can be easily obtained without the procedure for giving the internal pressure.

1 Claim, 2 Drawing Sheets

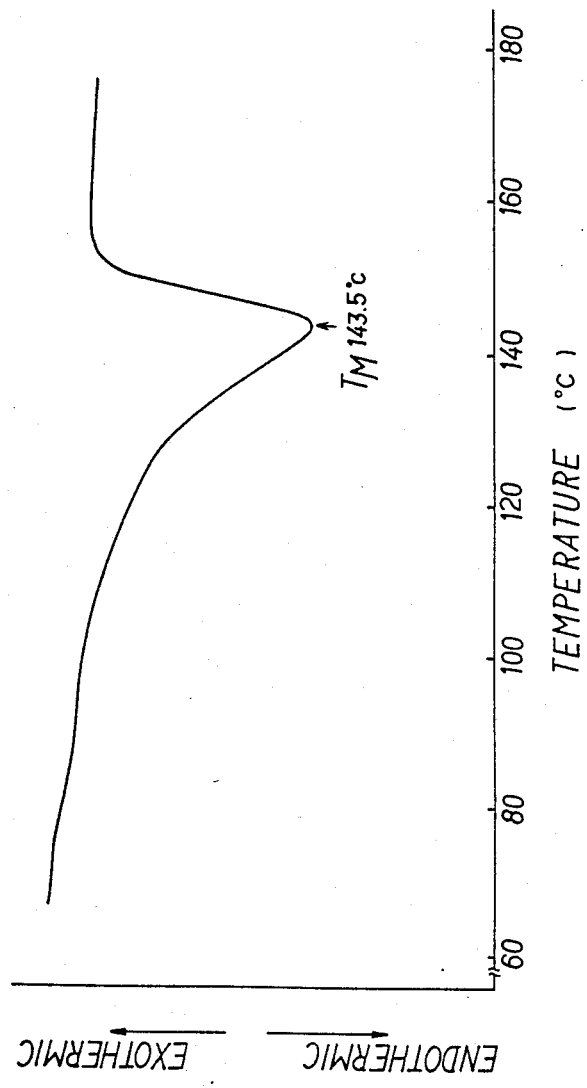

PRE-EXPANDED PARTICLES OF PROPYLENE RESIN

This is a division, of application Ser. No. 053,662 filed May 26, 1987, now U.S. Pat. No. 4,720,509, Jan. 19, 1988.

BACKGROUND OF THE INVENTION

The present invention relates to a pre-expanded particles of a propylene resin suitable for use in expasion molding in a mold, a process for preparing the pre-expanded particles, and a process for preparing a formed article by using the pre-expanded particles.

Hitherto, when pre-expanded particles of olefin resins such as a polyethylene are expansion molded in a mold, it is impossible to be retained a blowing agent in the pre-expanded particles for a long term, e.g. about a week unlike pre-expanded particles of a styrene resin. Therefore, an inorganic gas such as air is introduced into the pre-expanded particles under pressure just before molding in a mold to heighten the internal pressure of the pre-expanded particles to a desired value, and then the pre-expanded particles are charged into a mold and are fused together by heating with steam to give a foamed article. When pre-expanded particles of a propylene resin are expansion molded in a mold, since they are low in gas retention property alike pre-expanded particles of the polyethylene, after a pressured gas such as air is introduced and impregnated into the pre-expanded particles just before molding according to a process described in Japanese Unexamined Patent Publication No. 85158/1974, No. 101025/1983 and No. 40334/1986, and the like to give an internal pressure to the pre-expanded particles, the pre-expanded particles are charged into a mold and heated with steam to give a foamed article, in the same manner as in molding of pre-expanded polyethylene resin particles.

As mentioned above, when the pre-expanded particles of the olefin resins are molded in a mold, a procedure for giving an internal pressure to the pre-expanded particles before molding is indispensable, unlike polystyrene pre-expanded particles.

An object of the present invention is to solve the above-mentioned defect.

This and other objects of the present invention will become apparent from the description hereinafter.

SUMMARY OF THE INVENTION

It has now been found out that the above-mentioned defect can be solved only when, in pre-expanded particles of a propylene resin having two melting temperature as determined by differential scanning calorimetry, the heat of fusion $Q_H$ for the peak based on the higher melting temperature is adjusted within a specific range.

In accordance with the present invention, there is provided a pre-expanded particle of a propylene resin having two melting temperatures as determined by differential scanning calorimetry, the heat of fusion $Q_H$ for the peak based on the higher melting temperature being 0.5 to 2.3 cal/g. Also, in accordance with the present invention, there are provided a process for preparing the above pre-expanded particles and a process for preparing a foamed article from the above pre-expanded particles.

According to the present invention, it is possible to mold pre-expanded particles of propylene reins without a procedure for giving an internal pressure to them, which is economically advantageous.

BRIEF DESCRIPTION OF THE DRAWINGS

FIG. 2 is a chart measured by differential scanning calorimetry of a propylene resin used in the present invention.

DETAILED DESCRIPTION

Figure 1:
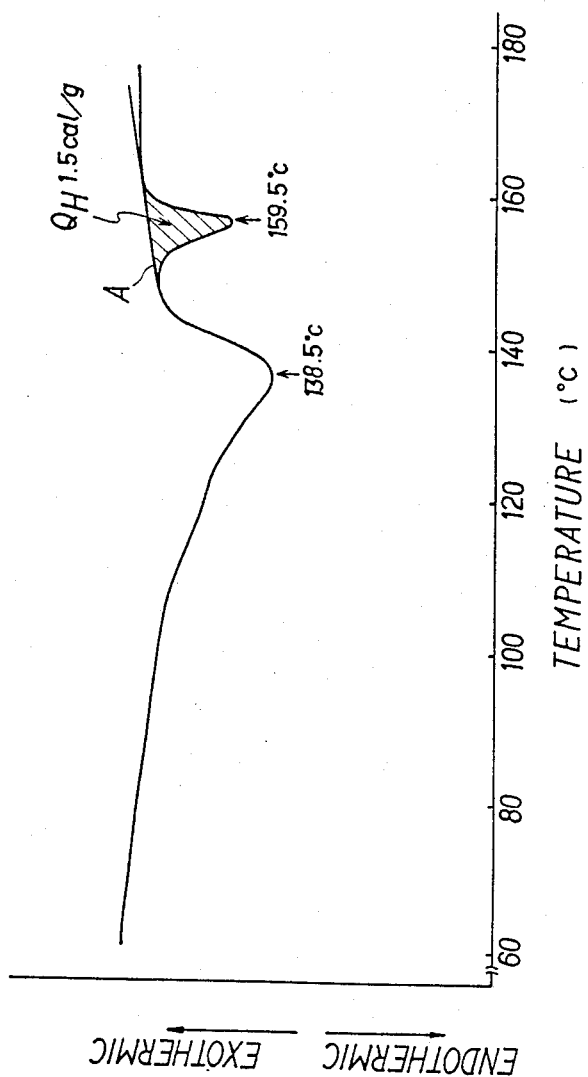
FIG. 1 is a chart measured by differential scanning calorimetry of pre-expanded propylene resin particles obtained in Example 3 described after.

Examples of the propylene resin used in the present invention are, for instance, propylene homopolymer, ethylene-propylene random copolymer, ethylene-propylene block copolymer, ethylene-propylene-butene random terpolymer, propylene-vinyl chloride copolymer, propylene-butene copolymer, copolymer of propylene and maleic anhydride, and the like. Stereospecific polymers are preferred. These propylene resins may be used alone or in admixture thereof.

Although non-crosslinked propylene resins are preferably used, propylene resins crosslinked by peroxide or radiation can be used. The propylene resins can be used in admixture with other thermoplastic resins so long as the properties of the propylene resin are impared. Examples of the other thermoplastic resins are, for instance, a low density polyethylene, a linear low density polyethylene, a polystyrene, a polybutene, an ionomer, and the like. For instance, when the propylene resin is used in admixture with the low density polyethylene, linear low density polyethylene, polybutene or ionomer, it is preferable that an amount of the thermoplastic resins is from 5 to 20 parts by weight based on 100 parts by weight of the propylene resin. When the propylene resin is used in admixture with the polystyrene, it is preferable that an amount of the polystyrene is from 5 to 10 parts by weight based on the propylene resin.

Usually, the propylene resins are previously molten by using an extruder, a kneader, a Banbury mixer, a roll, or the like, and are molded into particles having a desired shape such as a cylinder, a cylindroid, a sphere, a cube or a rectangul parallelepiped and having an average particle size of 0.1 to 10 mm, preferably 0.7 to 5 mm, for easily pre-expanding. The term "average particle diameter" as shown herein means a diameter of a sphere calculated from the volume of the polypropylene particle.

The pre-expanded particles of the propylene resin of the invention have distinct two melting temperatures as determined by differential scanning calorimetry (hereinafter referred to as "DSC"). The heat of fusion $Q_H$ for the peak based on the higher melting temperature (the $Q_H$ being found from the area for the higher melting peak) is from 0.5 to 2.3 cal/g, preferably 1.0 to 2.3 cal/g.

The relationship between the two melting temperatures is not particularly limited, but it is preferable that the difference between the melting temperatures if from 15° to 25° C. from the point that the pre-expanded particles are easily fused together on molding in a mold. The lower melting temperature is usually within a range of 125° to 155° C. and the higher melting temperature is usually within a range of 145° to 175° C. The melting temperature vary due to kinds of the propylene resin used.

When the heat of fusion $Q_H$ for the peak based on the higher melting temperature is within the range of 0.5 to 2.3 cal/g, it is possible to mold without the procedure for giving the internal pressure to the pre-expanded particles. When the heat of fusion for the peak based on the higher melting temperature is over 2.3 cal/g, it is hard to mold the pre-expanded particles without giving the internal pressure to them. On the other hand, when the heat of fusion is less than 0.5 cal/g, although it is possible to mold the pre-expanded particles without the procedure for giving the internal pressure to the pre-exapnded particles, the foamed article has a large dimensional shrinkage and the appearance of the article is inferior.

Also, when the expansion ratio of the pre-expanded particles is from 5 to less than 25, it is preferable that the heat of fusion for the peak based on the higher melting temperature is 1.0 to 2.3 cal/g, and when the expansion ratio is from 25 to 60, it is preferable that the heat of fusion is 1.0 to 1.7 cal/g.

Usual methods are applicable to the preparation of the pre-expanded particles of the invention. For instance, there is a method in which a volatile blowing agent is contained in the propylene resin particles in a pressure vessel, the particles are dispersed into water with stirring, the aqueous dispersion is heated to a predetermined temperature under pressure, and it is released into a low pressure zone.

In the above method, when the aqueous dispersion is released at a temperature within a range of about (the melting temperature of the propylene resin+1) °C. to about (the melting temperature +7) °C., the pre-expanded particles of the invention can be easily obtained. The releasing temperature is suitably determined due to the kind of propylene resin particles used, amount of the blowing agent, the desired expansion ratio of pre-expanded particles.

In the invention, examples of the volatile blowing agent contained into the propylene resin are, for instance, aliphatic hydrocarbons such as propane, butane, pentane and hexane; alicyclic hydrocarbons such as cyclopentane and cyclobutane; halogenated hydrocarbons such as trichloromonofluoromethane, dichlorodifluoromethane, dichlorotetrafluoroethane, trichlorotrifluoroethane, methylchloride, methylene chloride and ethyl chloride; and the like. The blowing agent may be used alone or in admixture thereof. The amount of the blowing agent is not particularly limited and is suitably decided according to the desired expansion ratio of the pre-expanded particles of the propylene resin. Usually, the amount of the blowing agent is from 5 to 50 parts by weight per 100 parts by weight of the propylene resin.

When preparing the aqueous dispersion, a dispersing agent can be used. Examples of the dispersing agent are, for instance, basic calcium tertiary phosphate, basic magnesium carbonate, basic zinc carbonate, calcium carbonate, and in addition thereto, a slight amount of a surface active agent such as sodium dodecylbenzenesulfonate, sodium n-paraffinicsulfonate, or sodium α-olefinsulfonate. The amount of the dispersing agent depends on the kinds of the dispersing agents and the propylene resins and the amounts of the propylene resin particlds. Usually, the amount of the dispersing agent is from 0.2 to 3 parts by weight per 100 parts by weight of water, and the amount of the surface active agent is from 0.001 to 0.1 part by weight per 100 parts by weight of water.

It is preferable to use the propylene resin particles containing the volatile blowing agent in an amount of 20 to 100 parts by weight per 100 parts by weight of water in order to satisfy the dispersibility in water.

After heating the aqueous dispersion under pressure in the presence of the blowing agent, it is released into a low pressure zone through an orifice having a hole size of 2 to 10 mm, thereby pre-expanding the propylene resin particles to give the pre-expanded particles of the resin.

As aforementioned, the aqueous dispersion is previously heated to a predetermined temperature under pressure in the pressure vessel. The expansion temperature (releasing temperature) is not readily dicided and depends on the kinds of the propylene resins, the desired heat of fusion $Q_H$ which is based on the peak for the higher melting temperature that resulting propylene resin particles would posses, and the like. The temperature is decided, as mentioned above, from the range of about (the melting temperature of the propylene resin +1) °C. to (the melting temperature of the propylene resin +7) °C., the melting temperature being measured according to DSC. On the other hand, the pressure is decided according to the determined expansion ratio and is usually from 10 to 50 kg/cm$^2$G.

Any pressure vessels are applicable to the invention so long as the vessel can satisfactorily withstand the above pressure and temperature. Examples of the pressure vessel are, for instance, an autoclave, and the like.

In the present invention, the melting temperature is measured according to DSC as mentioned above. As a measuring apparatus, there are exemplified usual apparatuses such as a DSC-2 calorimeter commercially available from the Perkin-Elmer Corp. and a TAS-100 calorimeter commercially available from Rigaku Denki Kabushiki Kaisha.

The measure of the melting temperature of the propylene resin is carried out by elevating a temperature at a rate of 10° C./minute in the above-mentioned apparatus with respect to 1 to 10 mg of the sample threof. The heat of fusion for the peak based on the higher melting temperature of pre-expanded particles is found from the area for the peak.

FIG. 2 is a DSC chart of a propylene-ethylene random copolymer having an ethylene content of 3.3% by weight. Also, FIG. 1 is a DSC chart of pre-expanded propylene resin particles obtained in Example 3, and is a view illustrating a method for measuring the heat of fusion for the peak based on the higher temperature. That is, the straight line A for finding the $Q_H$ is a tangent drawn from a point where a slop of a curve between the higher peak and the lower peak is O towoard the right shoulder of the higher peak.

Thus obtained pre-expanded particles are charged in a mold which is able to be closed but enable to be sealed, steam is introduced into the mold, and the pre-expanded particles are fused together with heating to give a foamed article having the same shape as the mold. That is, the foamed particle of the propylene resin having a good surface appearance, excellent fusing property and small dimensional shrinkage can be easily obtained by employing the pre-expanded propylene resin particles of the present invention without the procedure for giving the internal pressure to the pre-expanded particles. Accordingly, as a result that apparatuses for giving the internal pressure are not required and the procedure for giving the internal pressure is omitted, the cost for molding goes down extremely.

The present invention is more specifically described and explained by means of the following Examples and Comparative Examples in which all percents and parts are by weight unless otherwise noted. It is to be understood that the present invention is not limited to the Examples, and various charges and modifications may be made in the invention without departing from the spirit and scope thereof.

EXAMPLES 1 TO 6 AND COMPARATIVE EXAMPLES 1 AND 2

A pressure vessel was charged with 100 parts of pellets of random copolymer of ethylene and propylene (commercially available under the trade name "Noblen" made by Sumitomo Kagaku Kogyo Kabushiki Kaisha, ethylene content: 3.3%, a weight: about 1.8 mg/pellet, melting temperature by DSC: 143.5° C.), 20 to 22 parts of dichlorodifluoromethane, 1.5 parts of basic calcium tertiary phosphate powder as a dispersing agent, 0.006 part of sodium n-paraffinic sulfonate and 300 parts of water, and heated at a temperature as shown in Table 1. At that time, the inner pressure of the vessel was about 17 to 21 kg/cm$^2$G. After then, a valve provided at a lower part of the vessel was opened to release the aqueous dispersion into an atomospheric pressure through an orifice having a hole size of 4 mmo. During the release, the inner pressure of the vessel was maintained at 17 to 21 kg/cm$^2$G by introducing dichlorodifluoromethane with pressure. The thus obtained pre-expanded particles had an expansion ratio of 9 to 15.

The obtained pre-expanded particles had a heat of fusion for the peak based on higher melting temperature as determined by DSC shown in Table 1. Then the pre-expanded particles were filled in a plank mold having dimensions of 290 mm×270 mm×50 mm and heated with steam having a pressure of about 4.0 kg/cm$^2$G without giving an internal pressure to the pre-expanded particles to give a foamed articles.

The properties of the obtained foamed articles, i.e. the fusion percentage, dimensional shrinkage and surface appearance of the foamed article were measured by means of methods mentioned below. The results are shown in Table 1.

(Fusion percentage)

After the surface of the foamed article is cracked with a knife in depth of 5 mm, the article is divided along the crack and observed the section. The percentage of the number of the broken particles to the whole number of the particles is found.

⊚ : More than 80%
○ : From 60 to 80%
Δ: From 50 to 60%
×: Less than 50%

Usually, the fusion percentage which is required as a foamed article is at least 60%.

(Dimensional shrinkage)

The dimensions of the foamed article are measured with a slide calipers and the dimentional shrinkages are calculated as follows:

$$\text{Shrinkage (\%)} = \frac{\text{(Dimension of the mold)} - \text{(Dimension of the foamed article) (mm)}}{\text{Dimension of the mold (mm)}} \times 100$$

○ : The shrinkage is less than 3%
Δ: The shrinkage is from 3 to 5%
×: The shrinkage is more than 5%

(Surface appearance)

The foamed article is observed with the naked eye.
○ : The surface is smooth and no spaces between the particles are observed
Δ: The surface is smooth but spaces between the particles are slightly found
×: The surface is uneven and there are large spaces between the particles.

REFERENCE EXAMPLE

After giving an internal pressure into the pre-expanded particles obtained in Comparative Example 1 at 80° C. for 150 minutes under a pressure of 8.5 kg/cm$^2$G to adjust the internal pressure to about 2.3 atm, the particles were filled in the same plank mold as used in Example 1 and heated with steam having a pressure of about 3 kg/cm$^2$G to give a foamed article.

The properties of the obtained article were measured in the same manner as in Example 1. The results are shown in Table 1.

TABLE 1

| Ex. No. | Expansion temperature (°C.) | Expansion ratio of the pre-expanded particle | Heat of fusion for the peak based on a higher melting point ($Q_H$) (cal/g) | Fusion percentage | Dimensional shrinkage | Sirface appearance |
|---|---|---|---|---|---|---|
| 1 | 144.5 | 10.1 | 2.3 | ○ | ○ | ○ |
| 2 | 145.5 | 9.5 | 1.7 | ○ | ○ | ○ |
| 3 | 146.5 | 11.3 | 1.5 | ⊚ | ○ | ○ |
| 4 | 147.5 | 12.8 | 1.3 | ⊚ | ○ | ○ |
| 5 | 148.5 | 13.1 | 1.1 | ⊚ | Δ | ○ |
| 6 | 149.5 | 15.4 | 0.7 | ⊚ | Δ | ○ |
| Com. Ex. | | | | | | |
| 1 | 143.5 | 10.4 | 2.9 | × | Δ | × |
| 2 | 150.5 | 16.1 | 0.4 | ⊚ | × | × |
| Ref. Ex. | 143.5 | 10.4 | 2.9 | ⊚ | ○ | ○ |

EXAMPLES 7 TO 9 AND COMPARATIVE EXAMPLE 3

The procedure of Example 1 was repeated except that pellets of random copolymer of ethylene and propylene ("Noblen", ethylene content: 4.5%, a weight: about 1.3 mg/pellet, melting temperature measured by DSC: 135.5° C.) were used and an amount of dichlorodifluoromethane was from 30 to 35 parts to give pre-expanded particles of propylene resin having properties shown in Table 2.

The obtained pre-expanded particles were filled in a plank mold having dimensions of 290 mm×270 mm×50 mm without the operation for giving an internal pressure and heated with steam having a pressure of about 3.0 kg/cm$^2$G to give a foamed article.

The properties of the obtained articles were measured in the same manner as in Example 1. The results are shown in Table 2.

TABLE 2

| Ex. No. | Expansion temperature (°C.) | Expansion ratio of the pre-expanded particle | Heat of fusion for the peak based on higher melting point ($Q_H$) (cal/g) | Fusion percentage | Dimensional shrinkage | Sirface appearance |
| --- | --- | --- | --- | --- | --- | --- |
| 7 | 136.5 | 30.4 | 1.8 | ○ | ○ | ○ |
| 8 | 137.5 | 31.3 | 1.5 | ◎ | ○ | ○ |
| 9 | 138.5 | 33.1 | 1.2 | ◎ | ○ | ○ |
| Com. Ex. 3 | 133.5 | 29.8 | 2.4 | X | ○ | X |

As shown in Tables 1 and 2, when the heat of fusion for the peak based on the higher melting temperature is within the range of 0.5 to 2.3 cal/g, it is possible to obtain foamed articles having the excellent properties without giving the internal pressure to the pre-expanded particles.

When the pre-expanded particles of the invention is used, the procedure for giving the internal pressure into the pre-expanded particles before molding which is dispensable in conventional technique becomes unnecessary, and accordingly the preparation process are very simple. Also, the apparatus for giving the internal pressure is not necessary, which is economically advantageous.

What I claim is:

1. A pre-expanded particle of a propylene resin having two melting temperatures as determined by differential scanning calorimetry, the heat of fusion $Q_H$ for the peak based on the higher melting temperature being 0.5 to 2.3 cal/g.

* * * * *